P. E. NORRIS AND C. H. WITMER.
BATTERY PLATE FINISHING MACHINE.
APPLICATION FILED MAR. 17, 1917. RENEWED JUNE 2, 1921.

1,404,050.

Patented Jan. 17, 1922.
3 SHEETS—SHEET 1.

Witnesses
Jay E Bronk.
Ralph Munden

Inventor
Paul E. Norris
Christian H. Witmer.

By Raymond H Van Vleet
Attorney

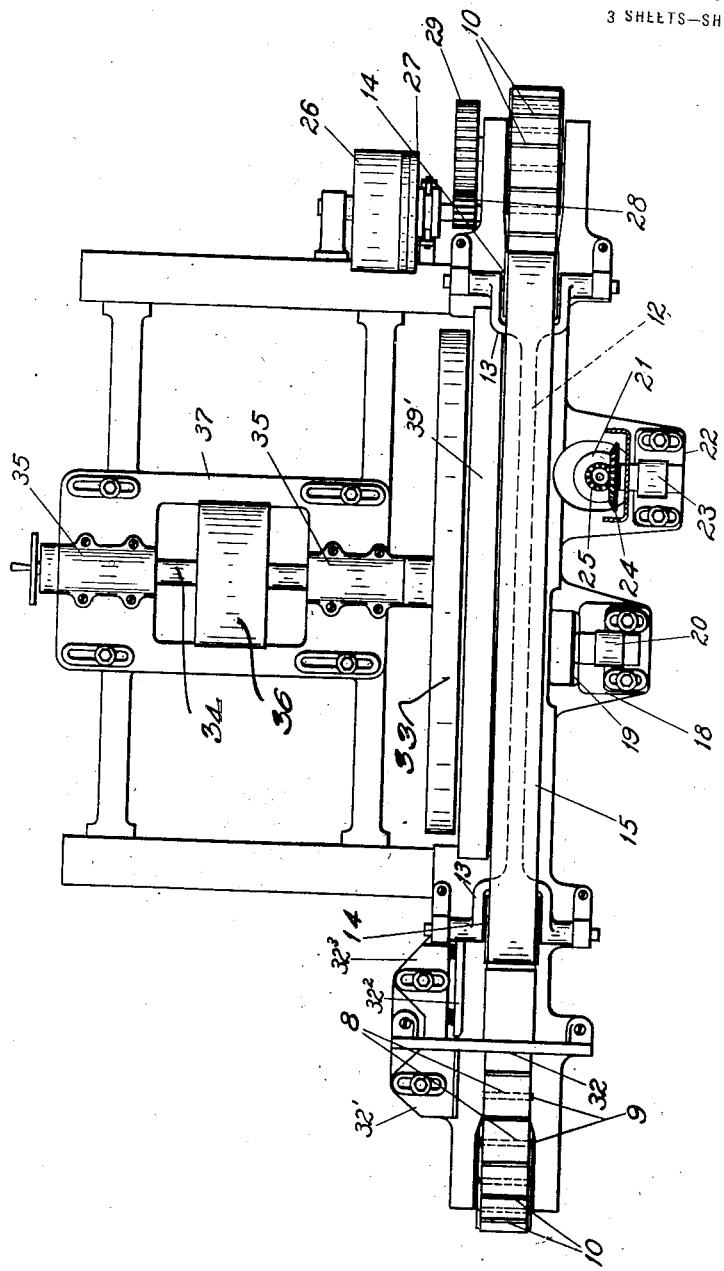

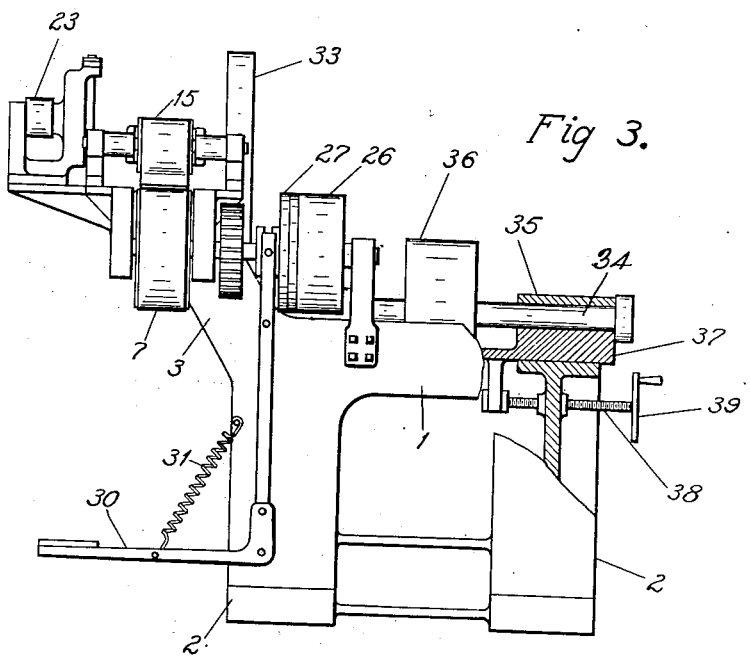
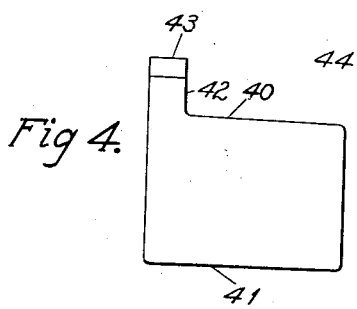
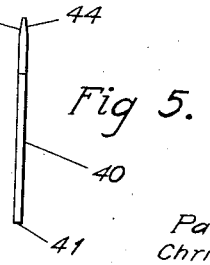

UNITED STATES PATENT OFFICE.

PAUL E. NORRIS, OF SWISSVALE, PENNSYLVANIA, AND CHRISTIAN H. WITMER, OF NIAGARA FALLS, NEW YORK, ASSIGNORS TO U. S. LIGHT & HEAT CORPORATION, OF NIAGARA FALLS, NEW YORK, A CORPORATION OF NEW YORK.

BATTERY-PLATE-FINISHING MACHINE.

1,404,050. Specification of Letters Patent. Patented Jan. 17, 1922.

Application filed March 17, 1917, Serial No. 155,423. Renewed June 2, 1921. Serial No. 474,526.

*To all whom it may concern:*

Be it known that we, PAUL E. NORRIS and CHRISTIAN H. WITMER, citizens of the United States, residing, respectively, at Swissvale, in the county of Allegheny and State of Pennsylvania, and Niagara Falls, county of Niagara, and State of New York, have invented new and useful Improvements in Battery-Plate-Finishing Machines, of which the following is a specification.

The present invention relates to battery plate finishing machines.

More particularly the present inventon relates to improvements in labor saving machines for finishing battery plates previous to connecting said plates by means of the usual straps. In casting the grids which form the foundation of battery plates, it is common practice to cast said grids in pairs. The pairs of plates are pasted and "formed" before they are cut apart. After the grids are cut apart, the rough edges where the two grids had been joined must be smoothed off. Furthermore, the ends of the lugs of the grids must be cut off to the proper height and the ends of said lugs must be finished in order to take off the rough edges, whereby the lugs may be readily inserted into the straps.

An object of the present invention is to provide a machine which will expeditiously smooth off the rough edge of the battery plates and finish off the lugs.

A further object is to provide a machine of the kind referred to, which will produce a uniform product.

Further objects will be apparent as the description proceeds.

Referring to the drawings: —

Figure 2 represents a plan view.

Figure 3 represents a view in end elevation.

Figures 4 and 5 represent in side and end elevation respectively, a battery plate which has been finished by the machine illustrated in Figures 1, 2 and 3.

Figure 1:
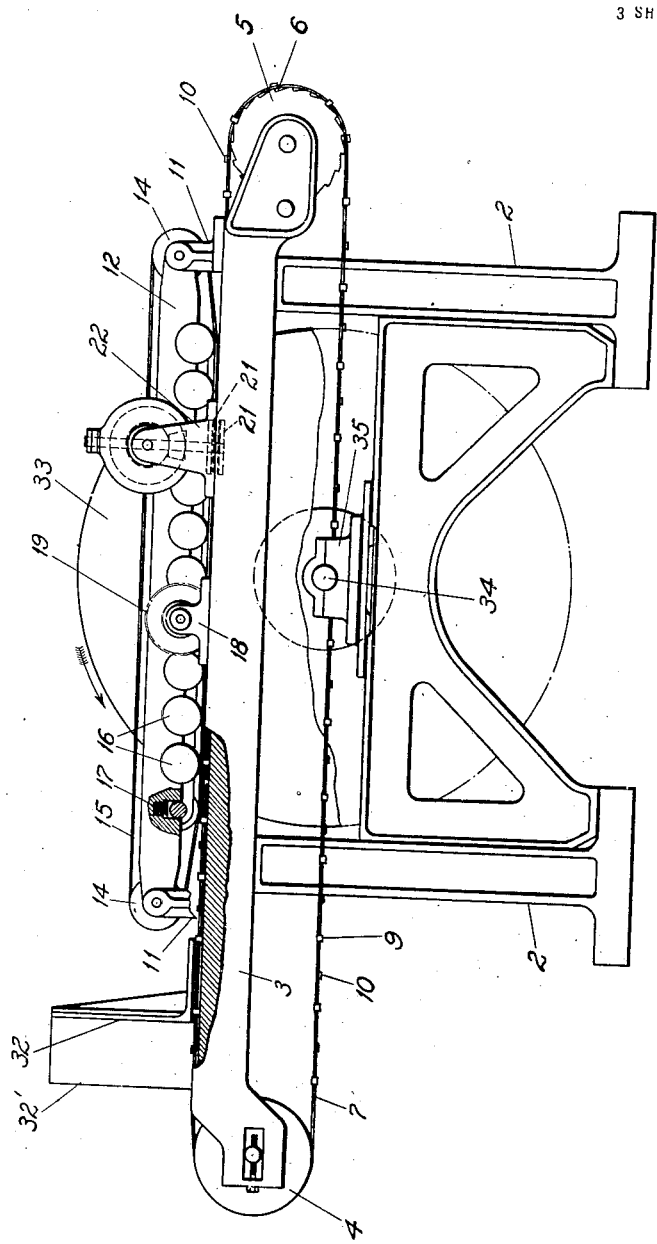
Figure 1 represents a view in elevation of one embodiment of the present invention, part of the abrasive wheel being broken away.

The table of the machine is represented by the numeral 1. Said table may be supported by legs 2, 2. Constituting a part of said table is an elongated bed-plate 3. Suitably journalled in the ends of said bed-plate 3 are the pulleys 4 and 5. The pulley 4 is indicated as being provided with teeth 6, whose function will be described hereinafter. Mounted on the pulleys 4 and 5 is a belt 7. The pulley 4 is shown as being adjustable longitudinally of the bed-plate 3, whereby to adjust the tension of the belt 7. Spaced at intervals along the belt 7, on the inside thereof, are cross-pieces 8, indicated in broken lines in Fig. 2. These cross pieces are provided with up-turned ends 9, 9, for a purpose which will be referred to hereinafter. It will be evident that the teeth 6 of the pulley 5, when said pulley is revolving in a clock-wise direction, as viewed in Fig. 1, will engage said cross-pieces 8, 8, to cause the movement of the belt 7. Arranged on the outside of the belt are cross-pieces 10, 10. The cross-pieces 10—10 will be spaced apart a distance greater than the length of the battery plates which are intended to be used in the machine.

Mounted upon the bed-plate 3 are small brackets 11, 11, which support a bar 12. As indicated in Figure 2, the bar 12 has a yoke 13 at each of its ends. Within each of these yokes is mounted a pulley 14. These pulleys 14, 14, are adapted to support a belt 15. The bar 12 on its under side, as indicated in Figure 1, is provided with a plurality of slots which serve to receive the axles of a number of pressure rollers 16, 16. These pressure rollers are adapted to press down upon the belt 15. If desired, spring means 17 may be provided to urge the pressure rollers 16 in a downward direction.

Suitably mounted on the bed-plate 3, intermediate of its ends, is a bracket 18. This bracket 18 forms a journal for the saw 19, which is arranged adjacent to the belts 7 and 15 in a position to saw off the ends of the lugs as they are carried past by the belt 7. Said bracket 18 is indicated as being adjustable, whereby the position of the saw may be adjusted to provide any desired length of lug. A pulley 20 may be provided for transmitting power to the saw 19. Located to the right of the saw 19, as viewed in Figures 1 and 2, are the milling cutters 21, 21. These milling cutters are supported from the bracket 22, which is preferably adjustable, as indicated in Figure 2. Power may be transmitted to said milling cutters through the pulley 23 and bevel gears 24 and 25.

Power for moving the belt 7 may be transmitted through the pulley 26. Power will be communicated through the clutch, indicated as a whole by the numeral 27, through the pinion 28 and gear 29, to the shaft of pulley 5 upon which the belt 7 is mounted. The clutch 27 may be operated by the pedal 30 (Fig. 3). As indicated in the drawings, the clutch 27 will normally be held open by the spring 31. When the operator desires to start the movement of the belt 7, he will depress the pedal 30.

The vertical stop plate 32 is located at the left hand end of the machine, as viewed in Fig. 1. The stop plate 32 will be spaced above the belt 7 a distance greater than the thickness of one battery plate, but less than the thickness of two battery plates, whereby only one battery plate may pass thereunder at one time. For ordinary service it will not be necessary to adjust the vertical position of the stop plate 32, though, of course, such adjustment may be provided if desired. The stop plate 32 should be readily removable, whereby a minimum of delay will be caused should a plate jam thereunder. An adjustable guide plate 32' may be provided, against which the plates may be piled. A spring-pressed guide plate 32² may also be provided, mounted upon an adjustable bracket 32³. As the plates are carried by the belt 7 beneath the stop plate 32, the spring-pressed guide plate 32² will urge them transversely of the belt 7 into contact with the lugs 9, 9.

A revolving wheel is indicated by the numeral 33. This wheel 33 is mounted upon a shaft 34 which is adapted to revolve in journal boxes 35, 35. Mounted on the shaft 34 is a pulley 36 through which power may be transmitted for turning the wheel 33. The shaft 34 with its journal boxes 35, 35, pulley 36 and wheel 33, are all mounted upon the frame 37, which frame 37 is movable cross-wise of the machine as viewed in Fig. 3. A threaded bolt 38 having suitable engagement with the frame 37 and the bed-plate 1, may be provided for adjusting the position of said frame 37. A hand wheel 39 may be provided for conveniently turning said threaded bolt 38. It will be clear from Figure 3 that by turning the hand wheel 39, the position of the frame 37, and consequently the position of the wheel 33, may be adjusted as desired. The left hand face of the wheel 33, as viewed in Figure 3, will be provided with abrasive material for finishing the edges of the battery plates as they are passed through the machine by the belt 7. A spacer 39' may be provided between the wheel 33 and the belt 7, at a height approximately equal to the height of the top of said belt 7, to support the edges of the plates as the abrasive wheel acts thereon. Different spacers may be provided for different sizes of plates.

A battery plate which has been operated upon by the machine as above described, is indicated in Figures 4 and 5. The body of the plate is indicated by the numeral 40. The edge upon which the abrasive wheel 33 is adapted to operate is indicated by the numeral 41. The edge which has been left by the saw 19 is indicated by the numeral 43. The finished surfaces which have been left by the milling cutters 21, 21, are indicated by the numeral 44.

A mode of operation of the above described embodiment of the present invention is substantially as follows: The belt 7, the abrasive wheel 33, the saw 19 and the milling cutters 21, 21, will be driven from any suitable source of power. The operator will stack up battery plates on the belt in engagement with the guide plate 32'. The operator will arrange the plates with the lugs extending downwardly, as the machine is illustrated in Figure 2, in a position to be engaged by the saw 19 and the milling cutters 21, 21. When the operator exerts pressure on the pedal 30, power will be communicated through the pulley 26, clutch 27, pinion 28 and gear 29, to the toothed pulley 5. The teeth 6 upon the pulley 5 will engage the cross-bars 8, 8, on the inside of the belt and exert a pull upon said belt. The upper portion of said belt will move in a right hand direction, as indicated in Figure 1, and will draw the lowermost of the pile of battery plates beneath the stop plate 32. Each succeeding cross-bar 10, 10, will draw a plate from the bottom of the pile, whereby the plates will be passed in succession through the machine. As the plates come into contact with the abrasive wheel 33, said wheel 33 will smooth off the edge 41 of each of the plates as it passes through the machine. As each of the plates passes the saw 19, the end of the lug 42 will be sawed off to the proper length, leaving the edge 43. As the plates proceed farther to the right, the milling cutters 21, 21 will engage the lugs 42 and finish off the ends of said lugs to provide the surfaces 44, 44, as indicated in Figure 5. As the plates emerge from the right hand end of the machine, as indicated in Figure 1, they may be collected by any convenient means and are now ready to be inserted into the usual straps.

One embodiment of the present invention has been described in detail. Various modifications will occur to those skilled in the art. It is intended that the patent shall cover all such modifications that come within the scope of the invention as defined by the appended claims.

What we claim as new and desire to secure by Letters Patent of the United States is:—

1. A battery plate finishing machine, comprising in combination, a conveying belt, means for feeding plates, one at a time, to said conveying belt, plate holding means on said conveying belt to limit movement of said plates transversely of said belt, abrasive means for finishing an edge of each of said plates, and cutting means for finishing the lugs of said plates.

2. A battery plate finishing machine comprising, in combination, a conveyor belt for carrying battery plates through said machine, a second belt for engaging said plates to hold them in their proper positions, and finishing tools located adjacent to said belt conveyor, said tools being adapted to operate upon said plates as they are carried past said tools.

3. In a battery plate finishing machine, in combination, a plate conveying belt, said belt being provided with plate engaging cross-pieces and means to limit movement of the plates transversely of said belt, and a revoluble abrasive wheel co-operating with said limiting means.

4. In a battery plate finishing machine, in combination, a plate conveying belt, said belt being provided with plate engaging cross-pieces and means to limit movement of the plates transversely of said belt, means for maintaining the plates in engagement with said belt and a revoluble abrasive wheel co-operating with said limiting means.

5. In a battery plate finishing machine, in combination, a plate conveying belt, said belt being provided with plate engaging cross pieces and means to limit movement of the plates transversely of said belt, a second belt for maintaining the plates in engagement with said conveying belt, means for urging said second belt toward said conveying belt, and a revoluble abrasive wheel co-operating with said limiting means.

6. In combination, a belt conveyor provided with means to prevent slipping of battery plates thereon, a revoluble abrasive wheel for finishing an edge of a battery plate, means for cutting off a lug of a battery plate to a predetermined length, and means for smoothing off the rough edges left by said cutting means.

7. In combination, a belt conveyor provided with means to prevent slipping of battery plates thereon, means for dispensing plates, one at a time, from a stack of plates to said conveyor, a revoluble abrasive wheel for finishing an edge of a battery plate, means for cutting off a lug to a predetermined length, and means for smoothing off the rough edges left by said cutting means.

8. In combination, a belt conveyor provided with means to prevent slipping of battery plates thereon, means for dispensing plates, one at a time, from a stack of plates to said conveyor, a revoluble abrasive wheel for finishing an edge of a battery plate, means for cutting off a lug to a predetermined length, and means for smoothing off the rough edges left by said cutting means, said belt conveyor being adapted to be stopped and started independently of the other elements.

9. A battery plate finishing machine comprising in combination, a plate conveyor having means for holding a plate in position thereon and abrasive means for smoothing an edge of each plate co-operating with said conveyor and plate holding means.

10. A battery plate finishing machine comprising in combination, a plate holding and conveying means and means co-operating with said holding and conveying means adapted to smooth one edge of each plate, and additional means also co-operating with said holding and conveying means for finishing the plate lugs on another edge of said plate.

11. In a battery plate finishing machine in combination, lug cutting and finishing means, edge finishing means, and means for conveying a plate in operating position with respect to said cutting and finishing means and holding said plate in position to be operated upon thereby.

12. In a battery plate finishing machine, means for withdrawing plates from a pile of plates, means for holding said plates and advancing them in succession and means operating on the plates while so held to cut off and finish the plate lugs, and abrasive means for automatically smoothing each of the plates also while so held.

13. In a battery plate finishing machine, a plate conveyor, a lug cutter, an abrasive edge finishing means, and means co-operating with said cutter and finishing means for holding a plate in position to be operated upon thereby.

In witness whereof, we have subscribed our names.

PAUL E. NORRIS,
CHRISTIAN H. WITMER.